Jan. 3, 1967 V. D. STABILITO 3,296,538

PHOTOMULTIPLIER AMPLIFIER AND POWER SUPPLY

Filed April 4, 1963 2 Sheets-Sheet 1

INVENTOR.
VINCENT D. STABILITO
BY Harry M. Saragovitz,
Edward J. Kelly, Herbert Berl &
S. Dubroff
ATTORNEYS:

INVENTOR.
VINCENT D. STABILITO
BY Harry M. Saragovitz,
Edward J. Kelly, Herbert Berl &
S. Dubroff
ATTORNEYS.

United States Patent Office 3,296,538
Patented Jan. 3, 1967

3,296,538
PHOTOMULTIPLIER AMPLIFIER AND POWER SUPPLY

Vincent D. Stabilito, Riverside, N.J., assignor to the United States of America as represented by the Secretary of the Army Filed Apr. 4, 1963, Ser. No. 270,775
4 Claims. (Cl. 328—243)

Figures 1, 2:
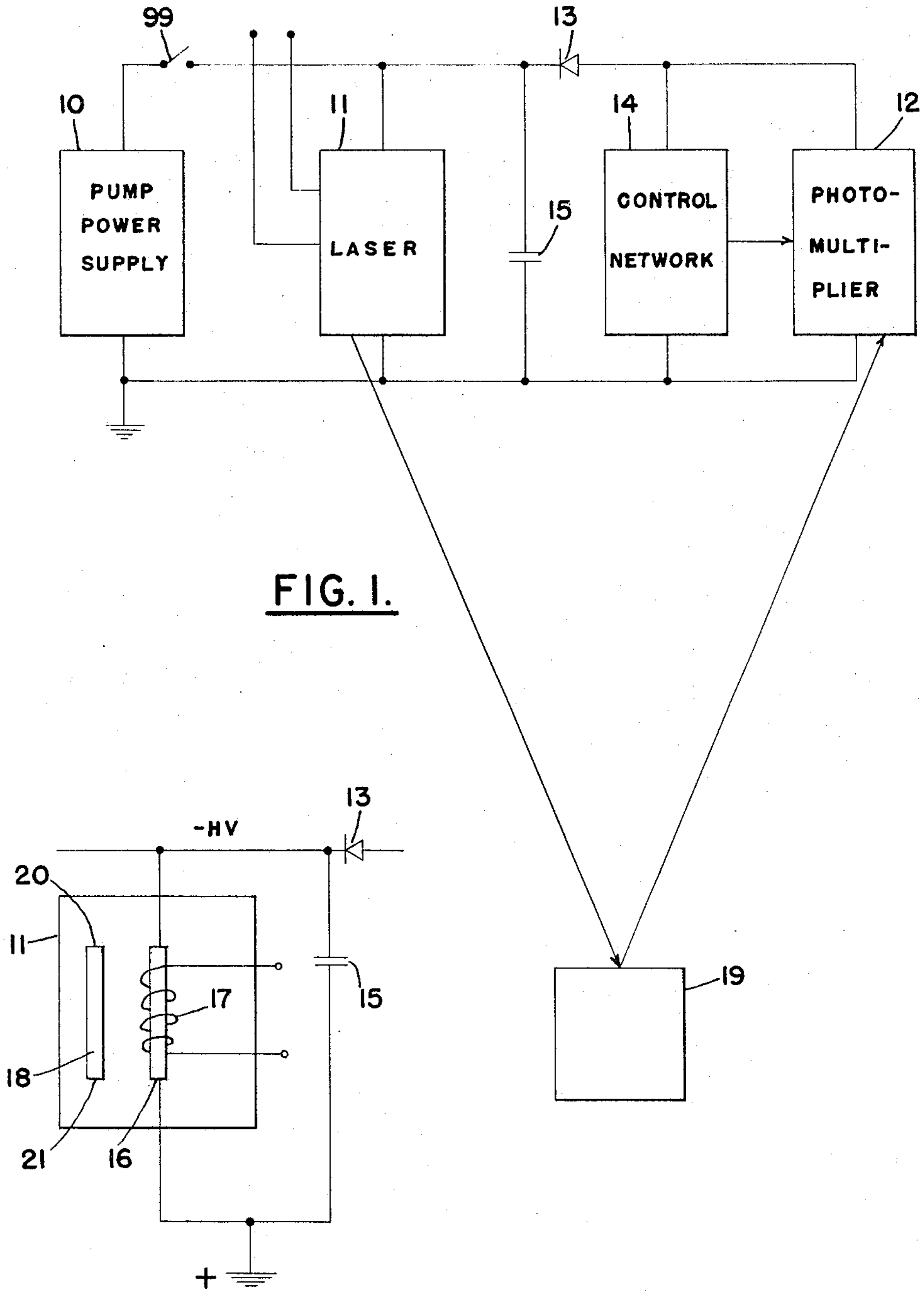

The invention described herein may be manufactured and used by or for the Government for governmental purposes without the payment to me of any royalty thereon.

This invention relates to photomultiplier amplifiers and power supply systems therefor. It is an object of this invention to provide an improved photomultiplier and power supply system which is adapted to be energized from a high voltage source and to retain an ability to energize the associated photomultiplier device or tube therein after the system is disconnected from said source. The system is hereinafter illustrated as utilized in a range finding system but is capable of other uses where it is desirable to maintain the said photomultiplier device or tube in an operable condition after the system is disconnected from its source of power.

As will appear in greater detail, the combined photomultiplier amplifier and power supply system of the present invention includes (1) a plurality of capacitors each connected between a different pair of anodes of the photomultiplier device or tube, (2) a short time constant distribution network, (3) a plurality of isolation diodes through which the capacitors are charged from the short time constant distribution network, and (4) a long time constant distribution network including a plurality of resistors each connected in shunt relation to a different one of the capacitors.

The invention will be better understood from the following description when considered in connection with the accompanying drawings and its scope is indicated by the appended claims.

Figure 3:
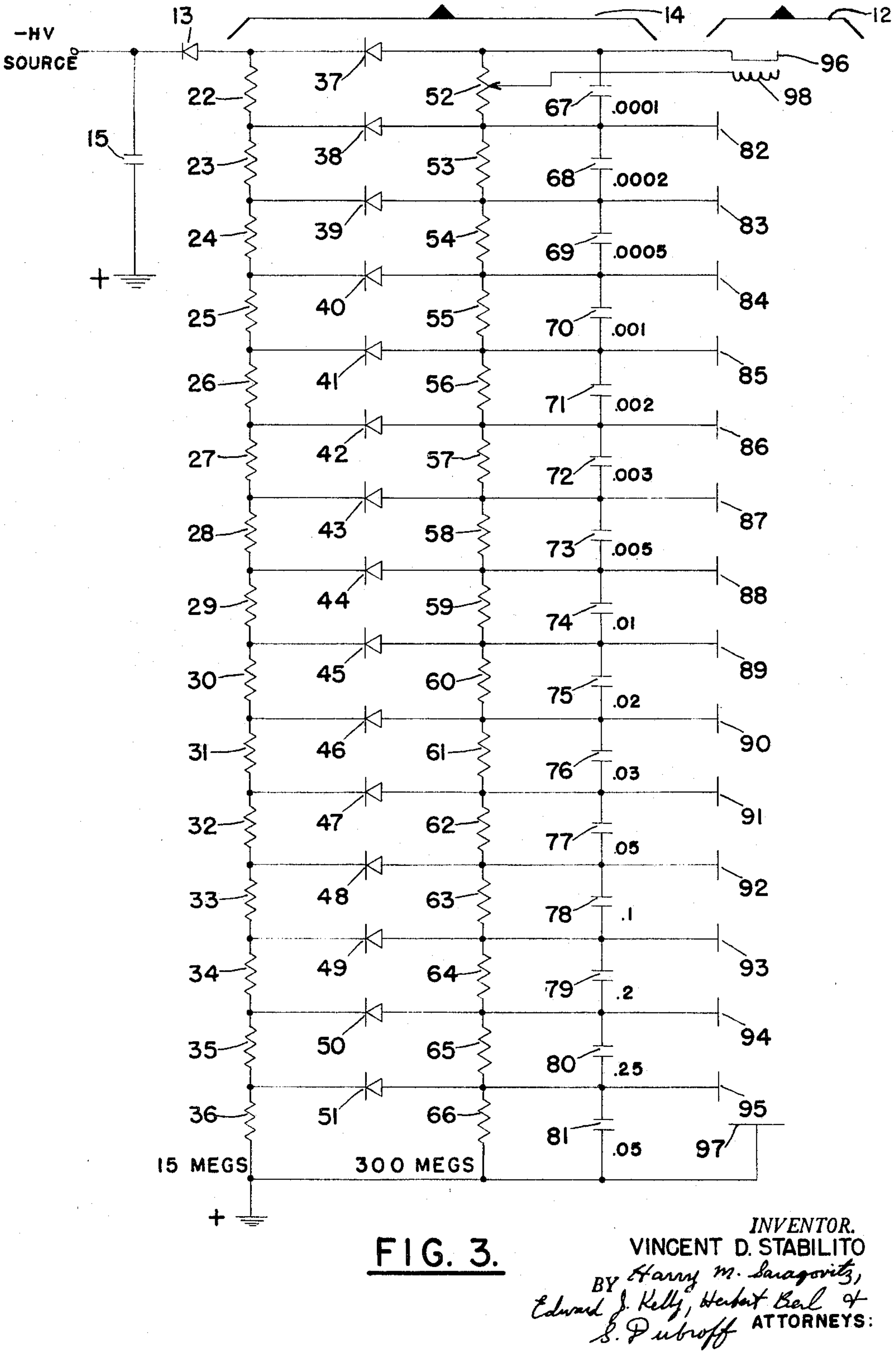

Referring to the drawings:

FIG. 1 is a schematic circuit diagram, in block form, indicating the relation between the various parts of a range finding system of which the present invention forms a part, FIG. 2 is a diagrammatic showing of a pulse generator or laser as related to the system of FIG. 1, and FIG. 3 is a detailed schematic circuit diagram of a portion of the system of FIG. 1, in accordance with the invention, which utilizes a single, high voltage source both to energize a pulse transmitter and to actuate a photomultiplier which receives and amplifies a reflected pulse.

The system of FIG. 1 includes a pump power supply 10 which is connected to energize a laser pulse generator 11 and a photomultiplier device or tube 12. Energizing voltage is applied to the photomultiplier device or tube through a coupling diode 13 and a control network 14. A storage capacitor 15 is connected in shunt relation to a lamp 16 (FIG. 2) of the laser pulse generator 11. When a trigger coil 17 is energized, the capacitor 15 is discharged through the lamp 16 and a ruby rod 18 is caused to emit a pulse of light which impinges on a target 19 and is reflected therefrom to the photomultiplier 12. Time measuring means (not shown) are utilized to indicate the time between the generation of the pulse and its reception by the photomultiplier, this time being indicated in terms of range or distance.

The laser 11 generator is a device well known to those skilled in the art. It includes a rod 18 of synthetic ruby having at one end a non-transparent mirror 20 and at the other end a semi-transparent mirror 21. In its operation, a pulse of white light from the lamp 16 raises the electrons in its chromium atoms to a higher energy level. The return of these electrons to their normal energy level produces a burst of red light which is reflected to and fro between the mirrors and stimulates other excited atoms into emitting red light some of which is radiated to the target 19 through the semi-transparent mirror 21.

The details of the control network 14 (FIG.1) are shown in FIG. 3. They include (1) resistors 22 to 36 which constitute a short-time-constant distribution network, (2) isolation diodes 37 to 51, (3) resistors 52 to 66 which constitute a long-time-constant distribution network, and (4) capacitors 67 to 81 which together with the dynodes 82 to 95 of the photomultiplier device or tube, constitute a dynode capacitor network. Associated with the dynodes 82 to 95 in a manner well understood by those skilled in the art are a cathode 96, an anode 97 and a grid 98.

Near each of the capacitors 67 to 81 is a notation indicating its capacitance in microfarads. The total resistance of the resistors 22 to 36 may be about 15 megohms. The specific values of the different resistors are determined by performance criteria. For example, dynodes 82 and 83 would normally have higher voltage difference than succeeding dynodes. The total resistance of resistors 52 to 66 may be about 300 megohms subject to the same conditions as stated in connection with the resistors 22 to 36.

The system is put into a standby condition by closure of a switch 99 (FIG. 1), thereby charging the capacitor 15. As the capacitor 15 charges, the capacitors 67 to 81 are charged by way of the short time constant distribution network 22 to 36 and the isolation diodes 37 to 51. When the capacitor 15 is fully charged, the isolation diodes 37 to 51 function to supply the loss of charge due to the dark current of the photomultiplier, thereby maintaining the capacitors 67 to 81 in a fully charged condition.

When the capacitor 15 is discharged through the lamp 16 by energization of the trigger circuit 17, the coupling diode 13 prevents the short-time-constant distribution network 22 to 36 from following suit. In addition, isolation diodes 37 to 51 disconnect the relatively-short-time-constant distribution network 22 to 36 from the capacitor string 67 to 81. The long-time-constant distribution network 52 to 66 is now active for the remaining function of the ranging operation i.e. the reception of the reflected light pulse by the photomultiplier 12, the conversion of this light pulse to an electronic pulse and the amplification of this electronic pulse to a level suitable for indicating and measurement purposes.

The values of the capacitors 67 to 81 in the dynode string of the photomultiplier are selected, in a manner well understood by those skilled in the art, to provide the peak pulse currents necessary for system performance while retaining a sufficient charge to allow adequate amplification of the received signal to be realized.

I claim:

1. In a laser power supply system, the combination with a photomultiplier device having an anode, a cathode and a series of dynodes spaced apart between said anode and cathode, of a plurality of voltage supply capacitors connected in series between said anode and cathode, a long-time-constant distribution network including a plurality of series-connected resistors connected between the said anode and cathode in parallel relation to said capacitor series, means conductively interconnecting the successive dynodes with the successive capacitor junctions and resistor junctions in the parallel connected capacitor and resistor series, a plurality of isolation diodes, a storage capacitor having a high-voltage supply circuit coupled therewith for charging said capacitor in response to applied supply voltages above a predetermined level, a short-time-constant distribution network including a plurality of series-connected resistors equal in number to the first named resistors and coupled therewith in parallel relation individually through said isolation diodes for charging said capacitors in response to charging of said storage capacitor to said voltage level, and means coupling said short-time-constant network in parallel relation with said storage capacitor for applying an output voltage above a predetermined level to said distribution networks and capacitor series.

2. In a laser power supply system, the combination as defined in claim 1, wherein the storage capacitor is connected to pulse a laser excitor lamp in response to triggering of the lamp, and wherein the coupling for the high-voltage supply circuit and storage capacitor with the short-time-constant network is controlled by a series diode which cuts off the coupling in response to triggering of the laser lamp, thereby to maintain operating voltages from said capacitor series for the photomultipler device.

3. A photomultiplier amplifier and power supply system, comprising in combination, a photomultiplier device having an anode, a cathode and a series of dynodes spaced apart between said anode and cathode, a source of relatively-high direct-current voltage having voltage output leads, a storage capacitor connected with said leads in parallel relation to said source to receive a high-voltage charge therefrom, a plurality of capacitors of a finite number related to the number of dynodes and connected in series between the anode and the cathode, means providing a conductive circuit connection between the successive dynodes in the series progressively from the cathode to the anode and corresponding junctions between the successive capacitors in the capacitor series to provide a dynode-capacitor network, a long-time-constant distribution network including a plurality of series-connected resistors having a total resistance measurable in hundreds of megohms and corresponding in number to said series-connected capacitors, means providing conductive connections between the successive capacitor junctions in dynode-capacitor network and the successive resistor junctions in said distribution network, whereby the successive resistors and capacitors of the two networks are connected in parallel relation in resistor-capacitor pairs, means providing a short-time-constant distribution network including a plurality of series-connected resistors coupled with said storage capacitor to receive current therefrom at a predetermined voltage level and having a total resistance measurable in megohms and diode coupling elements connected to couple the successive resistor junctions of the two distribution networks for current-conduction from the short-time-constant to the long-time-constant network and the series connected capacitors at predetermined voltage levels and to isolate said junctions at voltages below said levels.

4. A photomultiplier amplifier and power supply system as defined in claim 3 wherein the storage capacitor is connected to energize a laser pulse generator and radiate energy therefrom for reflection from a target to said photomultiplier device, thereby to activate said device to indicate the reflected energy and the presence of said target.

References Cited by the Examiner

UNITED STATES PATENTS

| | | | |
|---|---|---|---|
| 2,625,653 | 1/1953 | Wouters | 250—207 X |
| 2,846,591 | 8/1958 | Valeton | 250—207 |
| 3,003,065 | 10/1961 | Ketchledge | 250—207 |
| 3,076,896 | 2/1963 | Smith | 250—207 |

ARTHUR GAUSS, *Primary Examiner.*

J. JORDAN, *Assistant Examiner.*